(12) United States Patent
Del Toro et al.

(10) Patent No.: US 9,874,363 B2
(45) Date of Patent: Jan. 23, 2018

(54) AIR CONDITIONING SYSTEM WITH REDUCED POWER VENTILATION MODE

(71) Applicant: Carrier Corporation, Farmington, CT (US)

(72) Inventors: James Del Toro, LaFayette, NY (US); Jade R. Reynolds, Clay, NY (US)

(73) Assignee: CARRIER CORPORATION, Farmington, CT (US)

( * ) Notice: Subject to any disclaimer, the term of this patent is extended or adjusted under 35 U.S.C. 154(b) by 476 days.

(21) Appl. No.: 14/371,784

(22) PCT Filed: Jan. 15, 2013

(86) PCT No.: PCT/US2013/021532
§ 371 (c)(1),
(2) Date: Jul. 11, 2014

(87) PCT Pub. No.: WO2013/109519
PCT Pub. Date: Jul. 25, 2013

(65) Prior Publication Data
US 2015/0041114 A1 Feb. 12, 2015

Related U.S. Application Data

(60) Provisional application No. 61/587,867, filed on Jan. 18, 2012.

(51) Int. Cl.
*F24F 11/04* (2006.01)
*F24F 11/00* (2006.01)
(Continued)

(52) U.S. Cl.
CPC ............ *F24F 11/0001* (2013.01); *F24F 7/06* (2013.01); *F24F 7/08* (2013.01); *F24F 11/0079* (2013.01);
(Continued)

(58) Field of Classification Search
CPC .. F24F 11/0001; F24F 7/06; F24F 7/08; F24F 11/0079; F24F 2011/0002; F24F 2011/0064; Y02B 30/746
(Continued)

(56) References Cited

U.S. PATENT DOCUMENTS 3,979,922 A * 9/1976 Shavit .................... F24F 3/0525
165/251
3,982,583 A * 9/1976 Shavit .................. F24F 11/0001
165/249
(Continued)

FOREIGN PATENT DOCUMENTS

WO 2009061293 A1 5/2009

OTHER PUBLICATIONS

PCT International Preliminary Report on Patentability and Written Opinion of the International Searching Authority for International Application No. PCT/US2013/021532, dated Jul. 31, 2014, 7 pages.
(Continued)

*Primary Examiner* — Travis Ruby
(74) *Attorney, Agent, or Firm* — Cantor Colburn LLP

(57) ABSTRACT

An air conditioning system having a supply fan for supplying air to a supply duct; a fan motor for driving the supply fan; and a controller for controlling a speed of the fan motor, the controller operating the fan motor at a first speed in a first mode, a second speed lower than the first speed in a second mode and a third speed lower than the second speed in a ventilation mode.

8 Claims, 2 Drawing Sheets

(51) Int. Cl.
*F24F 7/06* (2006.01)
*F24F 7/08* (2006.01)

(52) U.S. Cl.
CPC ............... *F24F 2011/0002* (2013.01); *F24F 2011/0064* (2013.01); *Y02B 30/746* (2013.01)

(58) Field of Classification Search
USPC ........................................................ 165/244
See application file for complete search history.

(56) References Cited

U.S. PATENT DOCUMENTS

| | | | | |
|---|---|---|---|---|
| 4,176,525 A * | 12/1979 | Tucker | ............... | F24F 3/044 62/159 |
| 4,379,484 A * | 4/1983 | Lom | ............... | F24F 11/0009 165/251 |
| 4,519,539 A * | 5/1985 | Bussjager | ............... | F24F 1/022 165/250 |
| 5,447,037 A * | 9/1995 | Bishop | ............... | F24F 3/044 165/251 |
| 5,634,346 A | 6/1997 | Ramakrishnan et al. | | |
| 5,701,750 A | 12/1997 | Ray | | |
| 5,971,846 A | 10/1999 | Cho et al. | | |
| 6,161,764 A * | 12/2000 | Jatnieks | ............... | F24F 3/044 165/249 |
| 7,827,813 B2 * | 11/2010 | Seem | ............... | F24F 11/0001 236/44 C |
| 8,195,335 B2 * | 6/2012 | Kreft | ............... | F24F 3/044 62/186 |
| 8,364,318 B2 * | 1/2013 | Grabinger | ............... | F24F 11/0001 454/256 |
| 8,689,580 B2 * | 4/2014 | Lakdawala | ............... | F24F 5/0071 62/411 |
| 2006/0117769 A1 * | 6/2006 | Helt | ............... | F24F 11/0001 62/161 |

OTHER PUBLICATIONS

PCT International Search Report and the Written Opinion of the International Searching Authority, or the Declaration, for International Application No. PCT/US2013/021532, dated Mar. 28, 2013, 10 pages.

* cited by examiner

AIR CONDITIONING SYSTEM WITH REDUCED POWER VENTILATION MODE

BACKGROUND OF THE INVENTION

The subject matter disclosed herein generally relates to air conditioning systems, and in particular relates to an air conditioning system having a ventilation mode.

Air conditioning systems are used to provide heating, cooling and ventilation to buildings. As buildings become more insulated due to energy efficiency demands, operating the air conditioning system in a ventilation mode of operation occurs more commonly, to introduce fresh, outdoor air to the building. Improvements in the energy efficiency of air condition system ventilation modes would be well received in the art.

BRIEF DESCRIPTION OF THE INVENTION

One embodiment is an air conditioning system having a supply fan for supplying air to a supply duct; a fan motor for driving the supply fan; and a controller for controlling a speed of the fan motor, the controller operating the fan motor at a first speed in a first mode, a second speed lower than the first speed in a second mode and a third speed lower than the second speed in a ventilation mode.

Another embodiment is a method of controlling an air conditioning system having supply fan for supplying air to a supply duct and a fan motor for driving the supply fan, the method comprising: determining the commanded mode of operation; and controlling a speed of the fan motor, the controlling including operating the fan motor at a first speed in a first mode, operating the fan motor at a second speed lower than the first speed in a second mode and operating the fan motor at a third speed lower than the second speed in a ventilation mode.

DETAILED DESCRIPTION OF THE INVENTION

Figure 1:
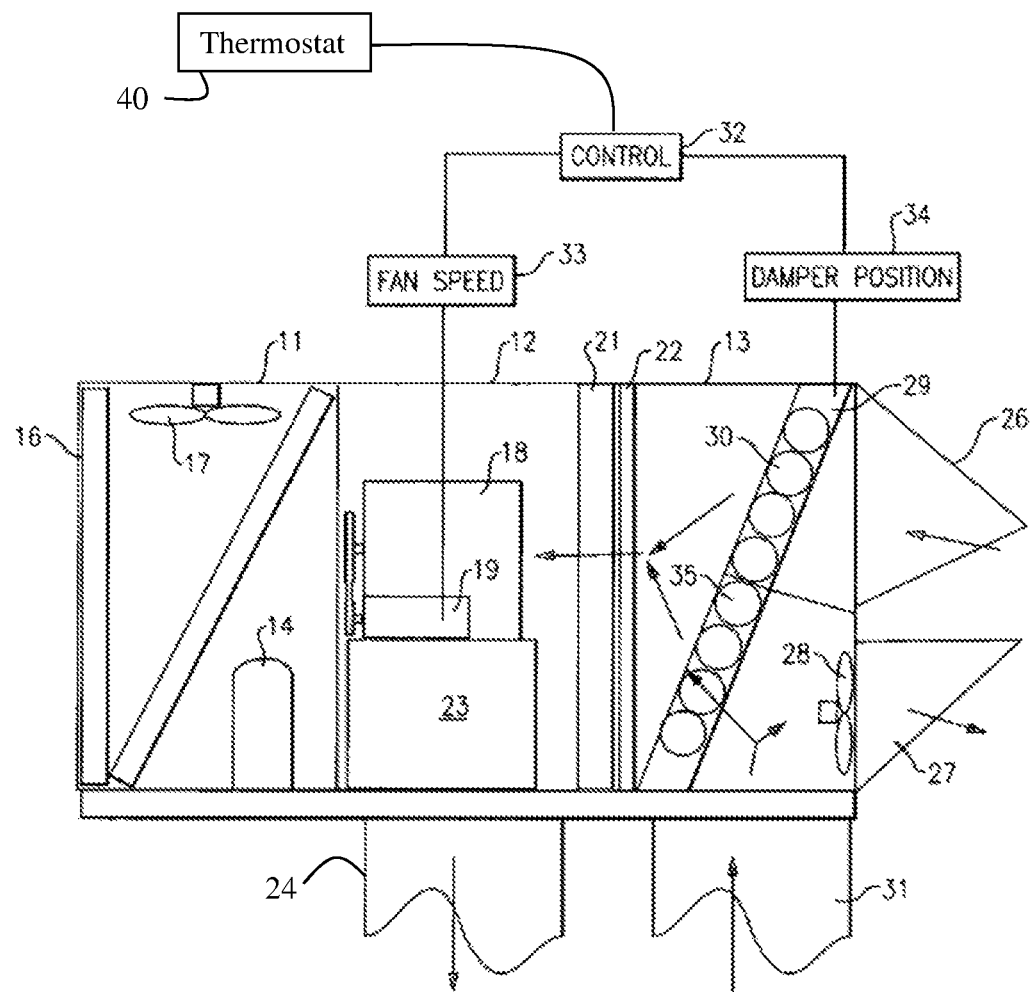
FIG. 1 depicts an exemplary air conditioning unit.

Shown in FIG. 1 is a typical packaged rooftop air conditioner having a condenser section 11, an evaporator section 12 and an economizer section 13. The condenser section 11 includes a compressor 14 for receiving refrigerant vapor from the evaporator section 12 and compressing the vapor before it is condensed. Also included in the condenser section 11 is a condenser coil 16 and a condenser fan 17 for passing ambient air through the condenser coil 16.

The evaporator section 12 includes a supply fan 18 which is driven by a fan motor 19. The fan motor 19 is adapted to operate at variable speeds to meet the cooling/heating requirements of the system and provide ventilation as described in further detail herein. A heater 23 is placed in a downstream position from the supply fan 18.

Leading into the evaporator section 12 from the economizer section 13 is a cooling coil 21 and its associated filters 22. In operation, the supply fan 18 draws air in through the filter 22 and the cooling coil 21 where it is cooled by refrigerant passing through the cooling coil 21. The cooled air then passes to the supply air duct 24 from which it is distributed within the building. Alternatively, in the heating mode, the air is passed from the supply fan 18 through the heater 23 where it is heated prior to being passed into the supply air duct 24.

Included within the economizer section 13 is an outside air intake vent 26, an exhaust air vent 27 and its associated exhaust fan 28, and an economizer damper 29. The economizer damper 29 includes an inlet air damper 30 and a return air damper 35. The inlet air damper 30 and a return air damper 35 may be linked so that the dampers move in concert. Inlet air damper 30 and a return air damper 35 include an actuator responsive to position commands from controller 32 to adjust the position of the dampers. As described in further detail herein, inlet air damper 30 and a return air damper 35 are adjustable by controller 32 to selectively mix an amount of outside air coming in the outside air intake vent 26 with the portion of the return air that is flowing into the economizer section 13 from the return air duct 31. Another portion of the return air is caused to pass out the exhaust air vent by the exhaust fan 28.

A controller 32 receives commands signals from thermostat 40 and controls fan speed 33 of fan motor 19 and damper position 34 of the inlet air damper 30 and a return air damper 35. Controller 32 may be a microprocessor-based device that executes computer program code to perform the functions described herein.

Figure 2:
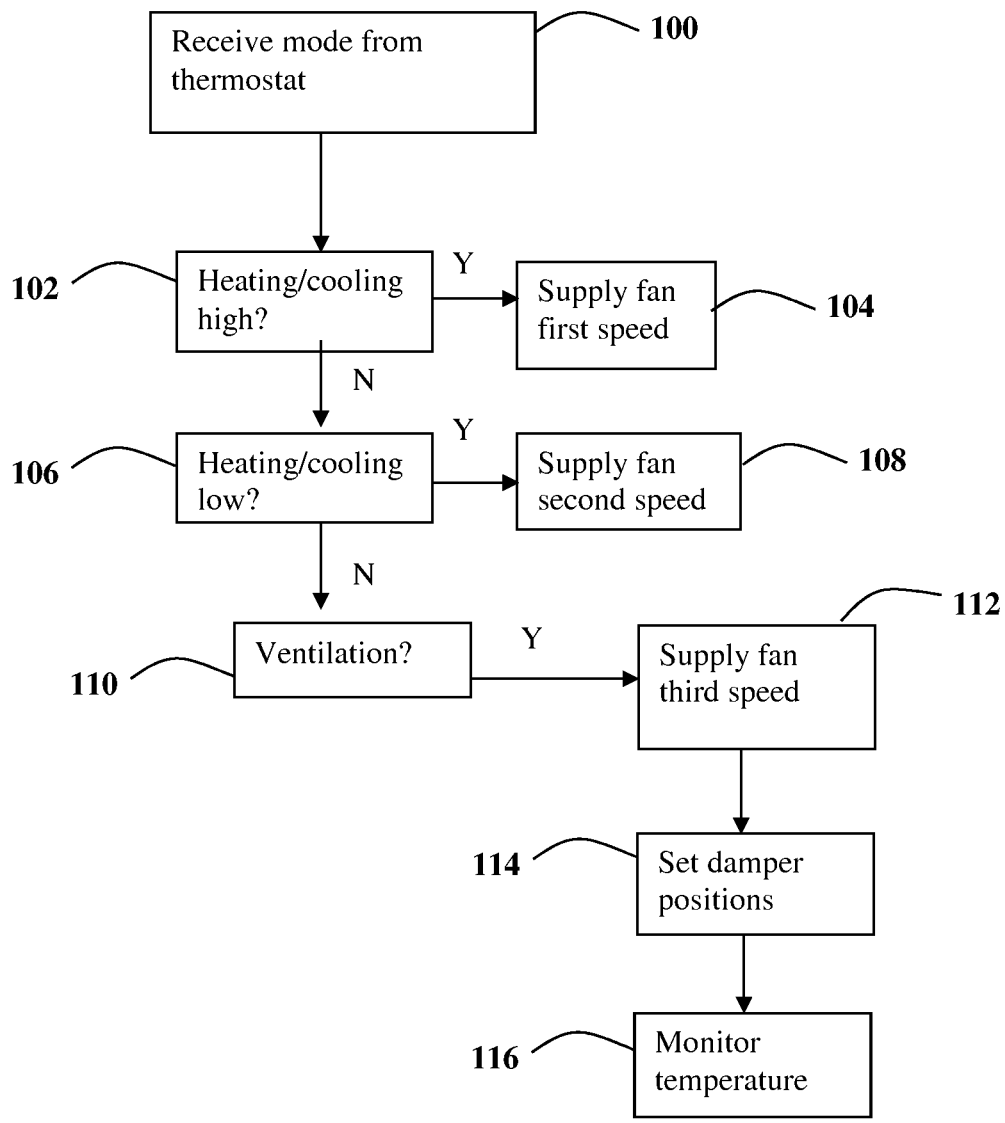
FIG. 2 is a flowchart of a control process in an exemplary embodiment.

In embodiments of the invention, fan 18 is driven in a ventilation mode to reduce power consumption and still meet desired ventilation thresholds. FIG. 2 is a flowchart of a control process in an exemplary embodiment. The process begins at 100 with thermostat 40 indicating a mode for operation, and optionally a desired air flow rate. If the mode is high heating or high cooling, at 102 flow proceeds to 104 where controller 32 commands fan motor 19 to run at a first speed. This first speed corresponds to a high air flow mode, which may be 2000 cubic feet per minute (CFM). If the mode is low heating or low cooling, at 106 flow proceeds to 108 where controller 32 commands fan motor 19 to run at a second speed slower than the first speed. This second speed corresponds to a low air flow mode, which may be 1340 cubic feet per minute (CFM).

If the mode is ventilation, at 110 flow proceeds to 112 to where controller 32 commands fan motor 19 to run at a third speed slower than the second speed. This third speed corresponds to a ventilation air flow mode, which may be 130 cubic feet per minute (CFM) in exemplary installations. The third speed of fan motor 19 will vary depending upon the ventilation demand of the space supplied by supply air duct 24. For example, the third speed of the fan motor 19 may be set based on regulations from industry entities (e.g., ASHREA 90.1) to meet certain minimum ventilation levels or ventilation demands of the space supplied by supply air duct 24. The installer may program the third speed of fan motor 19 as a fraction of the first speed or second speed. Further, the third speed of fan motor 19 may be programmed into controller 32 by an installer when the system is installed. This allows the ventilation demands of the space to be determined before the third speed is set.

At 114, controller 32 adjusts positions of the inlet air damper 30 and a return air damper 35. In ventilation mode, controller 32 opens inlet air damper 30 and closes return air damper 30 such that so that the airflow that is being circulated through the space is close to being 100% outdoor air. Return air from return duct 31 is drawn through exhaust air vent 27 and by exhaust fan 28. At 116, controller 32 monitors temperature of the space (e.g., via thermostat 40) to determine if the space has become too warm or cold, in response to the influx of outdoor air.

In exemplary embodiments, fan motor 19 is a three speed motor that operates at the first speed, second speed and third speed based on commands from controller 32. Controller 32 and fan motor 19 may use a variety of techniques to achieve the three speeds including using an electronically commutated motor (ECM), pulse width modulation (PWM) of drive signals, variable frequency drive (VFD), etc.

Embodiments provide a third speed for the fan motor to gain additional energy savings. This third fan speed is utilized whenever the unit is ventilating (the space is not requiring either heating or cooling). As the third speed is lower than the first and second speeds, less power is needed to operate the fan motor 19 at the third speed. The energy savings of this third speed would vary by locale and application, but could be as high a 40%

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning system comprising:
   a supply fan for supplying air to a supply duct;
   a fan motor for driving the supply fan; and
   a controller configured to control a speed of the fan motor, the controller configured to:
   determine when the air conditioning system is in one of high heat mode and high cool mode and operate the fan motor at a first speed;
   determine when the air conditioning system is in one of low heat mode and low cool mode and operate the fan motor at a second speed lower than the first speed; and
   determine when the air conditioning system is in ventilation mode and operate the fan motor at a third speed lower than the second speed.

2. The air conditioning unit of claim 1 further comprising:
   an outside air intake vent providing outside air to the supply fan;
   an inlet air damper for allowing and restricting flow of outside air to the supply fan.

3. The air conditioning unit of claim 2 wherein:
   in the ventilation mode, the controller is configured to open the inlet air damper to allow outside air to flow to the supply fan.

4. The air conditioning unit of claim 1 further comprising:
   exhaust air vent in fluid communication with ambient air outside the air conditioning unit; and
   a return air damper for directing return air to the supply fan and the exhaust air vent.

5. The air conditioning unit of claim 4 wherein:
   in the ventilation mode, the controller is configured to position the return air damper to direct return air to the exhaust air vent.

6. A method of controlling an air conditioning system having supply fan for supplying air to a supply duct and a fan motor for driving the supply fan, the method comprising:
   determining the commanded mode of operation; and
   controlling a speed of the fan motor, the controlling including:
   determining when the air conditioning system is in one of high heat mode and high cool mode and operating the fan motor at a first speed;
   determining when the air conditioning system is in one of low heat mode and low cool mode and operating the fan motor at a second speed lower than the first speed; and
   determining when the air conditioning system is in ventilation mode and operating the fan motor at a third speed lower than the second speed.

7. The method of claim 6 wherein:
   the air conditioning system includes an outside air intake vent providing outside air to the supply fan and an inlet air damper for allowing and restricting flow of outside air to the supply fan; the method further comprising:
   in the ventilation mode, opening the inlet air damper to allow outside air to flow to the supply fan.

8. The method of claim 6 wherein:
   the air conditioning system includes an exhaust air vent in fluid communication with ambient air outside the air conditioning unit and a return air damper for directing return air to the supply fan and the exhaust air vent;
   the method further comprising:
   in the ventilation mode, controlling a position of the return air damper to direct return air to the exhaust air vent.

* * * * *